No. 807,138. PATENTED DEC. 12, 1905.
R. N. STORY.
EGG CASE CARRYING ATTACHMENT FOR VEHICLES.
APPLICATION FILED SEPT. 1, 1905.
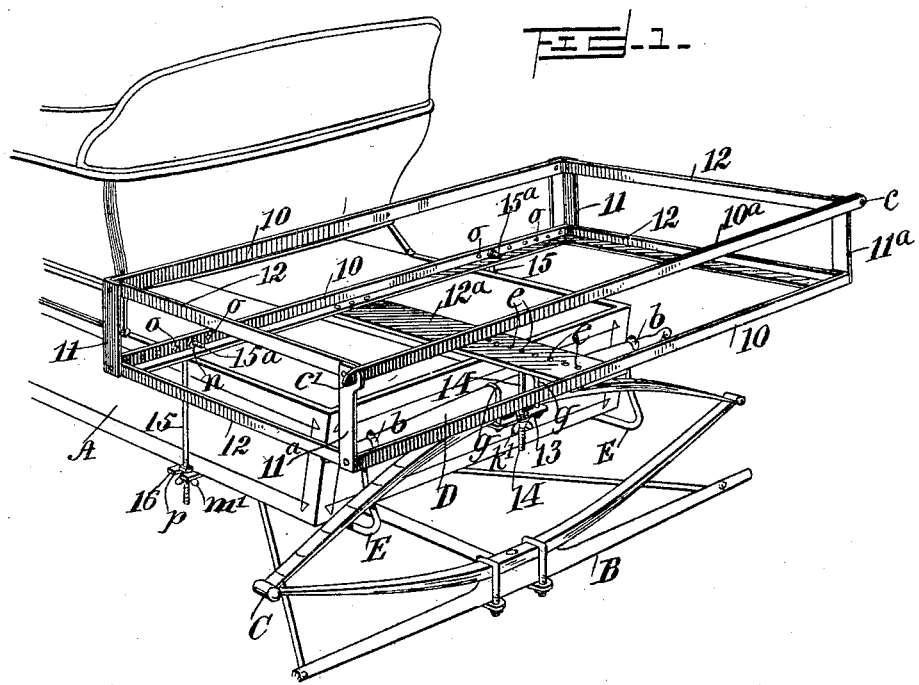
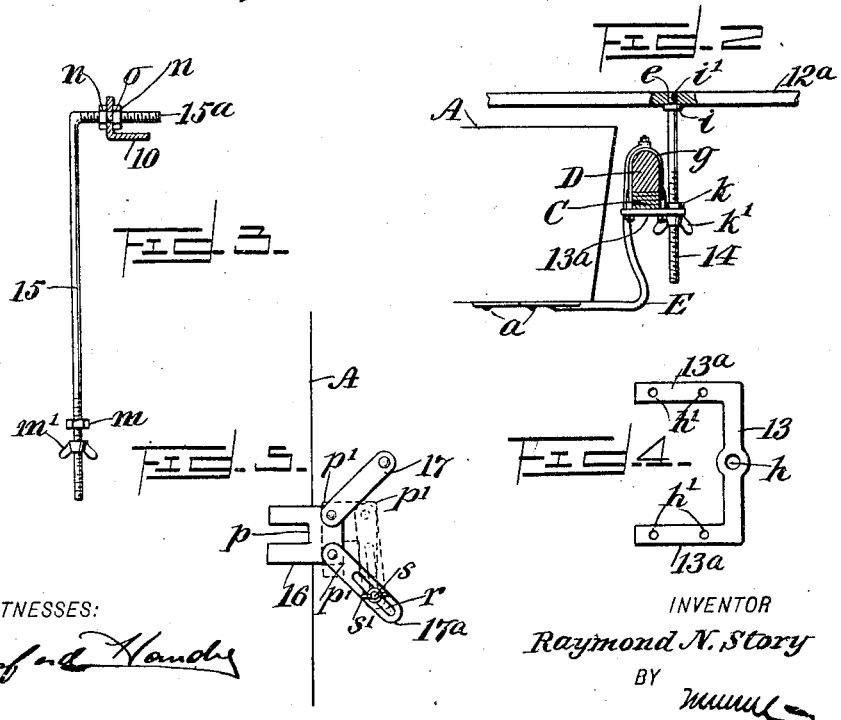
WITNESSES:
INVENTOR
Raymond N. Story
BY
ATTORNEYS

UNITED STATES PATENT OFFICE.

RAYMOND NELSON STORY, OF CLAY CENTER, KANSAS.

EGG-CASE-CARRYING ATTACHMENT FOR VEHICLES.

No. 807,138.  Specification of Letters Patent.  Patented Dec. 12, 1905.

Application filed September 1, 1905. Serial No. 276,733.

*To all whom it may concern:*

Be it known that I, RAYMOND NELSON STORY, a citizen of the United States, and a resident of Clay Center, in the county of Clay and State of Kansas, have invented a new and Improved Egg-Case-Carrying Attachment for Vehicles, of which the following is a full, clear, and exact description.

In rural districts throughout the country farmers and others raising poultry usually carry eggs as they accumulate in quantity to dealers in near-by towns for sale, such transfers being made in a spring-supported vehicle, such as a buggy, this being done to lessen the danger of breakage that would result if the eggs were carried on a wagon without springs. Ordinarily a case holding a considerable number of eggs is strapped upon the rear end of the vehicle, and as the egg-holding case is bulky it is difficult and very inconvenient to safely secure it on the rear portion of the conveyance.

The object of this invention is provide a novel simple case-holder that may be readily and securely mounted and detachably secured upon the rear portion of a buggy or like vehicle, and thus afford reliable means for conveniently placing and holding an egg-case on the vehicle for transportation of the filled case to a market for the eggs.

The invention consists in the novel construction and combination of parts, as is hereinafter described, and defined in the subjoined claims.

Reference is to be had to the accompanying drawings, forming a part of this specification, in which similar characters of reference indicate corresponding parts in all the figures.

Figure 1 is a perspective view showing the improved freight-carrying device mounted and detachably secured upon the rear portion of a vehicle-body that is supported by springs, one appearing in said view. Fig. 2 is an enlarged side view of the rear portion of a vehicle-body, a spring-bar, a carrier-arm extended up at the rear of the vehicle-body, and a portion of the freight-carrying device mounted rearwardly upon said carrier-arm. Fig. 3 is a detached enlarged perspective view of a novel clamping-bolt employed. Fig. 4 is a plan view of a clip-plate that is a detail of the invention; and Fig. 5 is a reversed plan view of a clamping device that in use coacts with the clamping-bolt for holding the freight-carrying frame detachably secured upon the rear portion of the vehicle-body.

In the drawings, A represents the body of a vehicle; B, the rear axle; C, an elliptical spring mounted upon the axle and secured thereto, and D a spring-bar clipped upon the center of the spring by means hereinafter described, the ends of said spring-bar being connected with the rear end of the vehicle-body by two carrier-arms E E, which are substantially L-shaped and have lower horizontal members extended below and secured upon the lower side of the body A, as shown at $a$ in Fig. 2. The main or upright portions of the carrier-arms E E are turned upward and secured by clips $b$ upon the spring-bar D near its ends, thus adapting said arms to support the body A from the spring-bar, spring, and rear axle, as indicated in Fig. 1.

The freight-carrying frame, which is specially well adapted for holding in position on the rear portion of a vehicle-body, such as A, an oblong case (not shown) containing eggs, but that may also be utilized for the support of other packages, is constructed of a number of light metallic bars that are arranged to provide a rectangular skeleton structure.

As shown in Fig. 1, the carrier-frame comprises, in part, four bars 10 $10^a$, that are spaced apart in pairs by four upright corner-posts 11 $11^a$, and said bars may be of angle-iron, as shown, thus rendering them strong and capable of resisting torsional strains. Two of the posts designated by the characters 11 are formed of L-shaped angle-iron cut to equal length; but the posts $11^a$ are in the form of flat metallic bars equal in length with the posts 11 and connect the frame members 10 $10^a$ together, and it will be seen that the connection of the posts with the elongated frame members produce two nearly similar rectangular frame-sections, the difference between them consisting in the pivotal attachment of one end of the frame member $10^a$, that in service is the upper one at the rear of the carrier-frame upon an adjacent post $11^a$, as at $c$, and forming a latch-hook $c'$ on the other end of said frame member $10^a$, said hook latching fast upon the remaining post $11^a$. The two rectangular frame structures described are spaced apart in parallel planes by four horizontal stretcher-bars 12 of an equal length, these iron bars being secured at their ends upon the posts 11 and $11^a$, thus forming a strong oblong rectangular frame of a capacity to receive within it a case or box such as is employed for the safe packing and conveyance of eggs from one locality to another. The carrier-frame just described is completed by a transverse brace 12ª, that is secured between the lower frame-bars 10 at their longitudinal center, and in said brace, which is in the form of a flat plate-like bar, a number of spaced and threaded perforations e are formed and disposed from the rear end of the brace toward the forward end of the same.

Referring to the means for connecting the spring-bar D with the upper leaves of the elliptical spring C, these normally consist of two inverted-U-shaped clip-bands g g, which are threaded at their lower ends, said ends passing through two clamping-plates that are clamped upon the lower side of the axle by nuts screwed on said threaded ends. In the improvement the clip-bands g g are utilized; but instead of employing the usual clamping-plates a single clamping-plate 13 is provided, consisting of a flat bar bent to produce two parallel limbs 13ª, extended at a right angle from the main portion thereof, and, as shown in Fig. 4, this rectangularly-looped clamping-plate 13 is formed with a perforation h central in its body portion and two spaced perforations h' in each of its limbs 13ª. The limbs 13ª lap upon and are secured to the lower side of the body A at its transverse center by bolts through the holes h' and project somewhat at the rear of the spring-bar D, disposing the body 13 of the clamping-plate behind the spring-bar.

A metal standard 14 in the form of a cylindrical rod threaded on the lower portion of its body is furnished with a collar i near its normally upper end, and the portion i' thereof above the collar is threaded for engagement within any one of the threaded perforations e that may be found to be directly above the perforation h in the clamping-plate 13 when the carrier-frame is in position for service. On the standard 14 a jam-nut k is mounted by screwing it to a suitable point thereon that will adapt said nut to rest upon the clamping-plate 13 when the standard is passed down through the perforation h therein, and a preferably winged nut k' is screwed upon the portion of said standard below the clamping-plate and into contact therewith, thus securing the standard erected from the plate 13 and adapted for the stable support of the rear portion of the carrier-frame.

The lower forward transverse member 10 of the carrier-frame, that is seated upon the side boards of the buggy-body, as shown in Fig. 1, is thereto detachably secured by the following-described means: Two similar clamping-bolts, such as the one shown at 15 in Fig. 3, are employed, each consisting of a cylindrical metallic rod of a suitable length, having a threaded arm 15ª extended at a right angle from the normally upper end of the body 15, and the latter is similarly threaded at and near its end. Upon the normally lower end portion of each clamping-bolt 15 a jam-nut m and a preferably winged nut m' are mounted by screwing them upon the threaded body thereof, and two jam-nuts n n are similarly mounted upon the threaded arm 15ª of each clamping-bolt. The arm 15ª on each clamping-bolt 15 is passed through one of a plurality of perforations o, that are formed in the upright member of the angle-iron frame-bar 10, nearly above the top edge of a respective side of the vehicle-body A, this being effected after the removal of one nut n from each arm and its subsequent replacement, thus clamping the arm fast upon the frame-bar and disposing the clamping-bolt pendent therefrom, as shown in Figs. 1 and 3.

A novel clamping device is provided for cooperation with each clamping-bolt 15, these duplicate devices each consisting of the following-described details of construction that appear in Fig. 5 as applied upon the bottom surface of the body A: A rectangular clamping-plate 16, having a slot p extended from one transverse edge inwardly, is pivoted at two of its corners p', that are at the opposite edge upon corresponding ends of two flat links 17 17ª, the link 17 being pivoted upon the lower side of the body A, near its side wall, and extending diagonally from the clamping-plate when the latter is projected outside of said side wall of the vehicle-body, as is shown by full lines in Fig. 5. The link 17ª is slotted longitudinally toward its normally inner end, as is shown at r in Fig. 5, and extends diagonally from the corner p' of the clamping-plate 16 in a direction opposite from the trend of the link 17. A threaded stud-bolt s is projected downward from the bottom of the vehicle-body A and passes loosely through the slot r, having a winged nut s' screwed upon its projecting end, which when adjusted tightly against the link 17ª will hold the clamping-plate projected exterior of the body A for engagement with the pendent appropriate clamping-bolt 16, as is shown at the left in Fig. 1, for one bolt and clamp.

It will be seen that from the relative positions given to the similar clamping-bolts 16 at each side of the vehicle-body A said bolts may have their jam-nuts m and winged nuts m' so relatively positioned thereon that the bolts may be rocked downward and enter the open slots r in the clamping-plates 16, whereupon a clamping adjustment of the nuts m m' will secure the carrier-frame firmly but removably clamped upon the vehicle-body A.

It will be seen that by providing the series of perforations e that are threaded and the two spaced sets of perforations o in the frame member 10 the carrier-frame may be mounted and properly secured upon vehicles of different widths and having the seat of the vehicle positioned differently with relation to the rear end wall of the vehicle-body, so that a standard size for the carrier-frame will be adapted for proper connection with the spring-supported bodies of vehicles of somewhat different dimensions.

As the boxes or cases for packing eggs to be carried to market are of substantially similar dimensions, the carrier-frame should be of corresponding size, so that the case or box may be conveniently slid within the frame and be secured therein by first rocking the frame-bar 10$^a$ upward, so as to open the rear end of the frame for the reception of the case, and subsequently closing said frame-bar by latching it fast upon the post 11$^a$ with its hook $c'$.

As the improvement is designed for temporary connection with the rear portion of the body of a vehicle having spring support on the running-gears, such as a buggy of usual construction, when the carrier-frame is removed from the vehicle-body the standard 14 is removed and the clamping-bolts 15 also. Then the clamping-plates 16 are turned into the position shown by dotted lines in Fig. 5, which will conceal them, this restoring the vehicle to normal condition.

Having thus described my invention, I claim as new and desire to secure by Letters Patent—

1. A carrier for freight on spring-supported vehicles, consisting of a rectangular metallic frame having a hinged top cross-bar at the rear side of the frame, and means for securing said bar closed, clamps for detachably holding the forward portion of the frame on the top edges of the vehicle-body, and means for supporting the rear portion of said frame from the rear spring of the vehicle.

2. A carrier-frame for freight comprising elongated frame-bars, posts connecting the ends of said frame-bars, one of the frame-bars having hinged connection with an adjacent post at one end thereof, and a latched connection with a corresponding post at the other end thereof, and stretcher-bars joining the posts and frame-bars, producing an elongated rectangular structure.

3. A carrier-frame for freight, comprising elongated frame-bars, two of said frame-bars being of L-shaped angle-iron, angle-iron posts joining two of the frame-bars at their ends, flat-bar posts joining the remaining frame-bars at their ends, the upper one of said frame-bars being pivoted at one end upon an adjacent flat-bar post and having a latched engagement at the other end with the remaining flat-bar post, and stretcher-bars joined at their ends to the frame-bars and posts, thus forming a skeleton rectangular elongated carrier-frame that may be opened at one side.

4. A carrier for freight on a vehicle, comprising elongated frame-bars, two of said bars being of L-shaped angle-iron, angle-iron posts joining two of the frame-bars at their ends, flat-bar posts joining the remaining frame-bars at their ends, the upper one of said flat bars, having one end pivoted, and the other end latched respectively on corresponding posts, stretcher-bars joined at their ends to the frame-bars and posts forming a skeleton rectangular frame, a flat brace extended across the frame on its lower side, and clamping means engaging the brace and the running-gears of the vehicle for holding the frame thereon.

5. In a freight-carrier of the character described, the means for clamping the carrier-frame upon the body of a vehicle, comprising clamping-bolts having lateral arms securable upon the lower frame-bars of the freight-carrier, clamping-plates adjustably held by links on the bottom of the vehicle-body, and nuts on the clamping-bolts, adapted for holding the clamping-plates compressed against the bottom of said body.

6. In a freight-carrier for a vehicle, the means for supporting a carrier-frame of the character described at its rear side above and from a vehicle-spring, comprising a flat brace on the lower side of the carrier-frame, a clamping-plate on said spring, and a standard erected from the clamping-plate and changeably engaging the flat brace.

In testimony whereof I have signed my name to this specification in the presence of two subscribing witnesses.

RAYMOND NELSON STORY.

Witnesses:
L. A. McNEE,
M. ROKES.